(12) United States Patent
Tanaka (10) Patent No.: US 9,836,408 B2
(45) Date of Patent: Dec. 5, 2017

(54) DATA PROCESSING METHOD, COMPUTER READABLE MEDIUM AND DATA PROCESSING DEVICE

(71) Applicant: Renesas Electronics Corporation, Tokyo (JP)

(72) Inventor: Katsunori Tanaka, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 252 days.

(21) Appl. No.: 14/885,830

(22) Filed: Oct. 16, 2015

(65) Prior Publication Data

US 2016/0154585 A1    Jun. 2, 2016

(30) Foreign Application Priority Data

Nov. 28, 2014 (JP) ................................ 2014-241102

(51) Int. Cl.
*G06F 12/08* (2016.01)
*G06F 9/45* (2006.01)
*G06F 12/0897* (2016.01)

(52) U.S. Cl.
CPC ............ *G06F 12/0897* (2013.01); *G06F 8/41* (2013.01); *G06F 2212/1016* (2013.01)

(58) Field of Classification Search
CPC . G06F 12/0897; G06F 8/41; G06F 2212/1016
See application file for complete search history.

(56) References Cited

U.S. PATENT DOCUMENTS

2013/0024667 A1    1/2013 Kyo
2014/0009568 A1*   1/2014 Stec ........................ G06T 5/006
                                                                348/36

FOREIGN PATENT DOCUMENTS

JP          2013-025547 A      2/2013

* cited by examiner

*Primary Examiner* — Eric S Cardwell
(74) *Attorney, Agent, or Firm* — McGinn IP Law Group, PLLC (57) ABSTRACT

A data processing method, a computer readable medium, and a data processing device capable of improving processing efficiency are provided. A storage destination of sub-read blocks is changed to a high-speed small-capacity memory on a high layer by adding a shape attribute in an attribute group for data blocks, adding a memory access monitoring unit for obtaining the shape attribute of a data block to the configuration of a data processing device, obtaining the shape attribute of the non-rectangular read block by executing a program on a trial basis, and propagating this shape attribute in a direction opposite to a data flow or a process flow within the program.

6 Claims, 9 Drawing Sheets

DATA PROCESSING METHOD, COMPUTER READABLE MEDIUM AND DATA PROCESSING DEVICE

CROSS-REFERENCE TO RELATED APPLICATIONS

This application is based upon and claims the benefit of priority from Japanese patent application No. 2014-241102, filed on Nov. 28, 2014, the disclosure of which is incorporated herein in its entirety by reference.

BACKGROUND

The present invention related to a data processing method, a computer readable medium, and a data processing device.

In recent years, due to the need for controlling the heat generation of a processor, the trend for improving the performance of the processor by increasing the number of processor cores that perform parallel processing, rather than increasing the operating frequency of the processor, has become widespread.

Japanese Unexamined Patent Application Publication No. 2013-025547 discloses a parallel processor in which, based on a group of attributes set for respective data blocks and configuration parameters indicating the configuration of the parallel processor, a transfer mode for each data block between a memory on the lowest layer (global memory) and a memory on other layers (a private memory or a local memory) is determined, and the transfer of each data block and parallel arithmetic correspond to that transfer are controlled.

SUMMARY

According to the above-described parallel processor, for a data transfer among a plurality of memories on different layers involved in arithmetic processing, the burden on a developer of user code is reduced and the portability of the user code is improved.

However, the present inventors have found the following problem. In the above-described parallel processor, a read transfer in which a data block is transferred from the global memory to the private memory or the local memory is performed before the parallel arithmetic, and a write transfer in which a data block is transferred from the private memory or the local memory to the global memory is performed after the parallel arithmetic. Consequently, the processing time increases, and therefore it has been desired to further improve the processing efficiency.

Other problems to be solved and novel features will be more apparent from the following descriptions in this specification and the accompanying drawings.

A first aspect of the present invention is a data processing method for a data processing device including: a program execution unit including a processor, and memories on a plurality of layers; an arithmetic control unit that receives a program and attribute values, the program including a plurality of subroutines for causing the processor to read a read block from the memory, perform data processing, and write a write block to the memory, the write block being a result of the data processing, the attribute values being set for the read block and the write block, respectively; and a memory access monitoring unit, the data processing method including: a step of executing, by the program execution unit, the program; a step of monitoring, by the memory access monitoring unit, a memory transfer of a data block or a sub-data block whose shape attribute value is a non-rectangle performed between the sub-routines and outputting memory access information related to the memory transfer to the arithmetic control unit; and a step, performed by the arithmetic control unit, of: calculating a shape attribute value by converting a read address or a write address of the data block based on the memory access information; correcting an attribute value by propagating the attribute value including at least the calculated shape attribute value in a direction opposite to a data flow or a process flow within the program; dividing, for each data block exchanged between the subroutines, the data block into sub-data blocks when the attribute value and performance/configuration information of the processor and the memory satisfy a predetermined condition; selecting a memory from which the sub-data blocks are read or to which the sub-data blocks are written from among the memories on the plurality of layers; and controlling memory access to the data block or the sub-data blocks and execution of a subroutine related to the data block performed by the processor.

Note that those that express the above-described methods according to the embodiment as an apparatus or a system, programs that cause a computer to implement the aforementioned apparatus or a part of the above-described apparatus, image-pickup apparatuses including the aforementioned apparatus are also regarded as embodiments according to the present invention.

According to the above-described aspect, it is possible to provide a data processing method, a computer readable medium, and a data processing device capable of improving the processing efficiency.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

For clarifying the explanation, the following descriptions and the drawings may be partially omitted and simplified as appropriate. Further, each of the elements that are shown in the drawings as functional blocks for performing various processes can be implemented by hardware such as a CPU, a memory, and other types of circuits, or implemented by software such as a program loaded in a memory.

Therefore, those skilled in the art will understand that these functional blocks can be implemented solely by hardware, solely by software, or a combination thereof. That is, they are limited to neither hardware nor software. Note that the same symbols are assigned to the same components throughout the drawings and duplicated explanations are omitted as required.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Embodiment

A data processing method according to a first embodiment reduces the execution time of a program by adding a shape attribute in a group of attributes (hereinafter also called an "attribute group") set in each data block, adding a memory access monitoring unit for obtaining the shape attribute of a data block to the configuration of a data processing device, obtaining the shape attribute of a data block that is divided into non-rectangular shapes by executing the program on a trial basis, and changing a storage destination of sub-data blocks to a high-speed small-capacity memory on a high layer by propagating the obtained shape attribute in the direction opposite to the data flow or the process flow within the program.

The data processing method according to the first embodiment is explained hereinafter in relation to an image recognition technique, which is one of the techniques to which the data processing method can be applied.

The image recognition is a technique for extracting various information items such as whether there is an object or not from an image, and in general is implemented in combination with a plurality of basic image processes. Each of these image processes is processed as a subroutine. An image is expressed as two-dimensional array of a number of unit data called "pixel". Most of image processes are performed by applying (i.e., performing) similar calculation to each pixel in the image. One of examples of the image processes is a process called a "filtering process". The filtering process is a process for converting an image and used to obtain, for example, an effect of eliminating noises from the original image.

In the filtering process, by referring to a square area composed of 3-5 pixels by 3-5 pixels around a pixel having certain coordinates, a product-sum operation is performed by multiplying pixel values of the pixels within the square area by coefficients determined based on their relative positions. By doing so, a converted pixel value of the pixel having the certain coordinates is obtained. To convert the whole image, the pixel conversion is applied (i.e., performed) to the whole image (i.e., all the pixels in the image). Although coordinates and pixel values are different from one pixel to another, the same calculation is applied (i.e., performed) for each of the pixels. This feature is common to most of the image processes.

When image processing is performed, an image is expressed as two-dimensional array of data blocks and divided into areas called "sub-data blocks". Further, the image processing is applied (i.e., performed) for each sub-data block. The advantage of the block division is a reduction in processing time owing to an increase in data transfer efficiency.

As a technique for implementing a data processing system for multi-dimensional array data blocks such as images, there are a parallel processor using a graph manager and a control method for a parallel processor. Similar to ordinary computer programs, a multi-dimensional array processing program such as an image recognition processing program includes at least one subroutine.

A subroutine performs (i.e., causes a computer or the like to perform) processing after reading a multi-dimensional array data block from a memory and finishes the processing after writing a multi-dimensional array data block into a memory. The data block read by the subroutine is a read block and the data block written by the subroutine is a write block.

The graph manager expresses a program by using a directed graph in which subroutines are defined as nodes and data block transfers between nodes are defined as edges.

Figure 1:
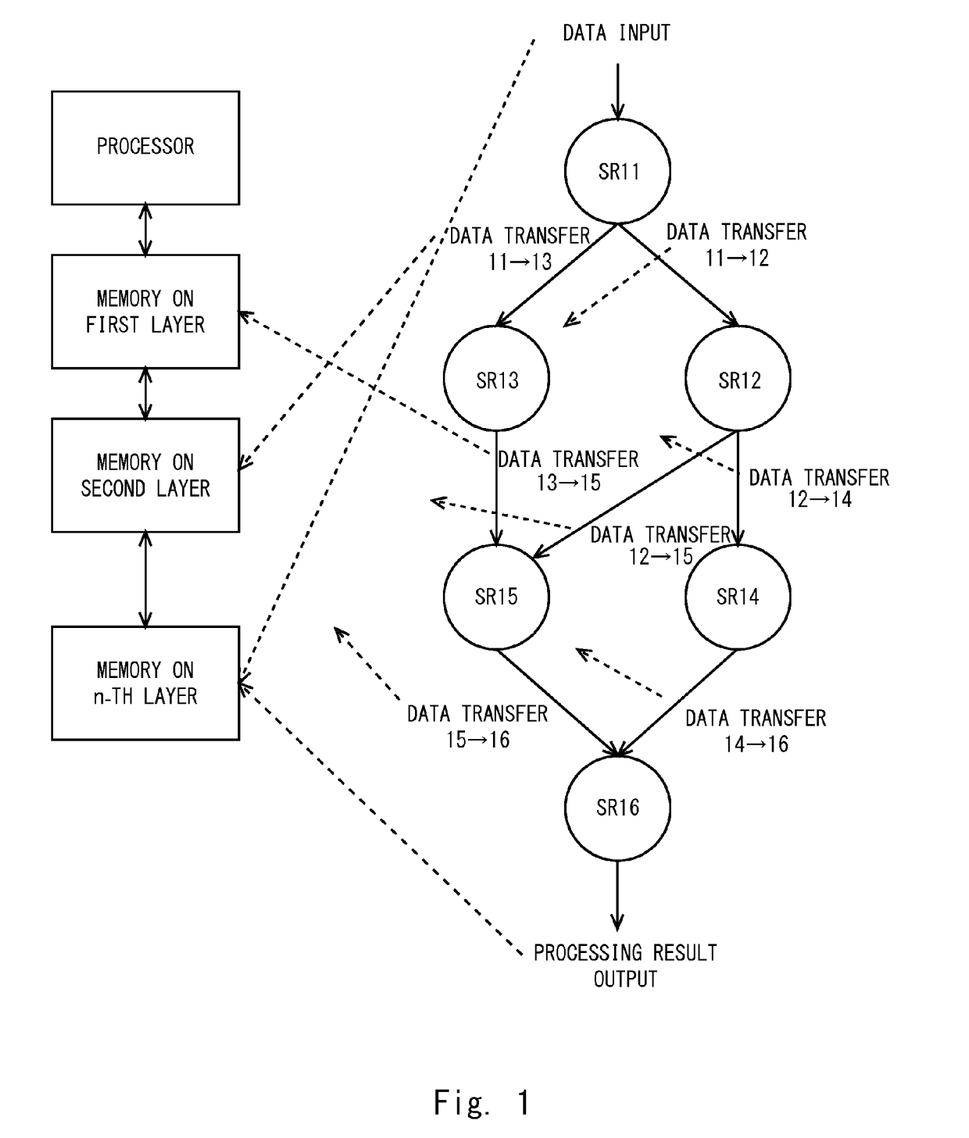
FIG. 1 shows a directed graph expressing a program and shows resource allocation to the program.

FIG. 1 shows a directed graph expressing a program and shows resource allocation to the program. In this directed graph, six subroutines SR11 to SR16 performed in a series of processes from a "data input" to a "processing result output" are defined as nodes. Further, the "data input" and the "processing result output", and data transfers among the subroutines SR11 to SR16 are defined as edges.

For the end point/start point of each edge, attribute values of an attribute group (a size attribute, a read attribute, a write attribute, a margin attribute, a broadcast attribute, an assignment attribute, a hierarchy attribute, and a dependence attribute) indicating characteristics of a read block/write block are provided. When a program is assigned to hardware, i.e., when a program is mapped, nodes are assigned to a processor and edges, which are implemented as data transfers among the nodes, are assigned to a memory.

The graph manager performs a block division and resource allocation based on the configuration of the processor and memories on a plurality of layers, and the attribute values of a read block and a write brock input/output to/from a node.

In the block division, a write block and a read block connected by an edge are divided into sub-data blocks, while comparing the attribute values of the write block with those of the read block, so that a sub-write block is included in a sub-read block, i.e., so that the node on the writing side can provide data elements to which the node on the reading side refers, and so that the data size of the sub-read blocks and the sub-write blocks after the division become equal to or smaller than the capacity of a memory on a high layer.

In the resource allocation, a processor that executes a subroutine indicated by a node and a memory that is used for a data block transfer or a sub-data block transfer indicted by an edge are determined. Each of the broken lines with arrows shown in FIG. 1 is an example indicating resource allocation to an edge. For example, they shows that a memory on the n-th layer is allocated to the "data input" and a memory on the first layer is allocated to the "data transfer 13→15". An input data block to the program is first stored in a memory on the lowest layer (n-th layer) and eventually written into a memory on the lowest layer. Note that the illustration of lines indicating resource allocation to nodes is omitted in FIG. 1.

The simplest resource allocation is to allocate the memory having the largest capacity in the lowest layer to each edge. However, this lowers the data transfer speed and increases the execution time of the program. Therefore, an idea that for each edge, a data block is divided into sub-data blocks and they are assigned to a memory(ies) in as high a layer(s) as possible is examined.

For example, in the example shown in FIG. 1, assuming that the transfer data block in the edge from the node SR13 to the node SR15 can be divided into sub-data blocks that are equal to or smaller than the capacity of the memory on the highest layer, i.e., the memory on the first layer, the memory on the first layer can be resource-allocated as a memory for its sub-data block transfer. Further, if the transfer data block in the edge from the node SR11 to the node SR13 is larger than the capacity of the memory on the first layer but is smaller than the capacity of a memory on the second layer, the memory on the second layer can be resource-allocated as a memory for its sub-data block transfer.

Note that read access or write access to a data block, which is divided into non-rectangles, is regarded as random access to the whole data block. Therefore, this data block is not divided into sub-data blocks and hence a low-speed large-capacity memory has to be used for the transfer of this data block.

One of examples of the process in which a data block is divided into non-rectangular sub-data blocks is an image distortion correction process. In this process, a distorted image and an array of correction values for the coordinates of each pixel included in the distorted image are provided as a read block and a corrected image is output as a write block. It is necessary to make the write block dividable into rectangles for the subsequent subroutine processes. Therefore, the read block is divided into non-rectangular sub-read blocks and each pixel in the sub-read blocks is displaced through a distortion correction process so that rectangular sub-write blocks can be obtained.

Therefore, in the data processing method according to the first embodiment, a shape attribute, which is an attribute expressing a non-rectangular sub-data block, is added in the above-described attribute group so that the graph manager can divide a data block into non-rectangular sub-data blocks.

Further, in the data processing method according to the first embodiment, when a data block can be actually divided into sub-data blocks but its sub-data blocks are non-rectangles and their specific shapes are unknown, memory access information is obtained by executing the program on a trial basis. Then, an address conversion is performed based on the specific shapes of the sub-data blocks obtained from the memory access information and the data block is thereby made dividable into sub-data blocks, thus enabling a high-speed memory to be used for the transfer of the sub-data blocks.

Next, the data processing method according to the first embodiment is explained by using an example case where the data processing method is implemented by using an OpenCL device, which is a data processing device.

Note that the data processing method according to the first embodiment can be implemented by using a data processing device including a program execution unit including a processor and memory on a plurality of layers. For example, the data processing method can be implemented by using a micro-controller including a multi-core processor, a multi-thread processor, or an SIMD (Single Instruction Multi Data) processor. Further, the data processing method can be implemented by using an SoC or the like. That is, the data processing device that implements the data processing method according to the first embodiment is not limited to the OpenCL device.

Figure 2:
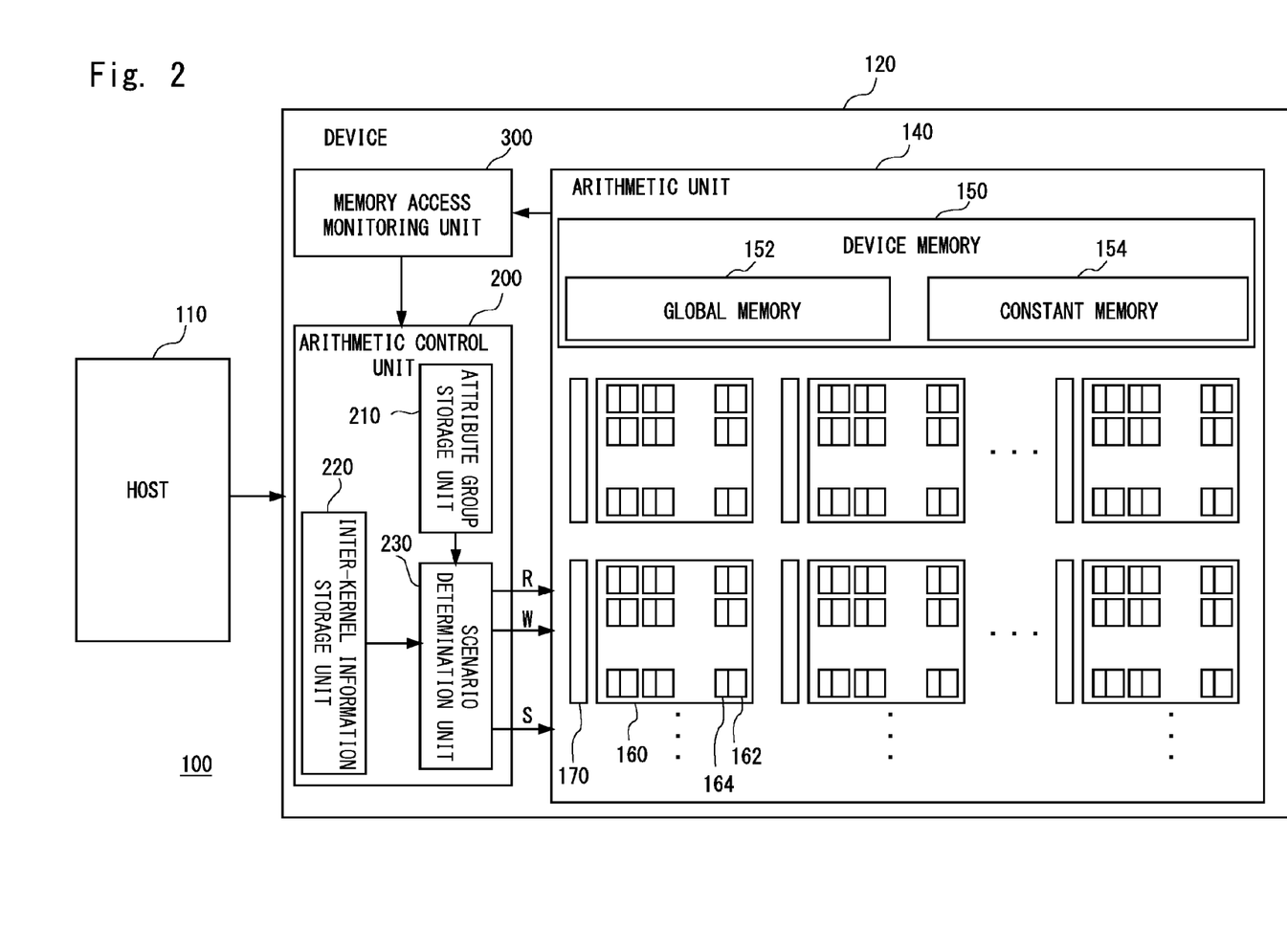
FIG. 2 shows a schematic configuration of an OpenCL system 100 according to a first embodiment.

FIG. 2 shows a schematic configuration of an OpenCL system 100 according to the first embodiment. The OpenCL system 100 includes an OpenCL host (hereinafter simply called a "host") 110, an OpenCL device (hereinafter simply called a "device") 120 and so on.

The device 120 includes an arithmetic control unit 200, an arithmetic unit (program execution unit) 140, a memory access monitoring unit 300 and so on. The arithmetic control unit 200 includes an attribute group storage unit 210, an inter-kernel information storage unit 220, a scenario determination unit 230, and so on. The arithmetic unit 140 includes a device memory 150, a plurality of computing units (CUs) 160, a plurality of local memories 170 provided for the respective CUs 160, and so on.

Further, the device memory 150 includes a global memory 152, a constant memory 154 and so on. Further, each of the CUs 160 includes a plurality of arithmetic elements (processors, PEs) 162, a plurality of private memories 164 such as caches provided for the respective PEs 162, and so on. In principle, the plurality of arithmetic elements 162 processes the same program in parallel. Further, the arithmetic elements 162 are in charge of and process their respective data blocks that are obtained by dividing image data.

Note that the global memory 152, the constant memory 154, the CU 160, the PE 162, the private memory 164, the local memory 170 and so on are similar to those having the same names in an ordinary OpenCL device, and therefore their detailed explanations are omitted here.

Further, the configuration of the OpenCL system 100 except for the inter-kernel information storage unit 220 and its data processing method are partly in common with those disclosed in Patent Literature 1. Therefore, please refer to Patent Literature 1 for them.

When the host 110 instructs the device 120 to perform an operation, the host 110 transfers a kernel that is designated by an argument specified by a user and corresponds to this operation, i.e., a program, to the device 120.

The inter-kernel information storage unit 220 holds therein information indicating a data block dependence relation among a plurality of kernels, i.e., a plurality of subroutines that are executed in succession (hereinafter called "inter-kernel data block dependence information"). This information may be directly entered to the inter-kernel information storage unit 220 by a user. Alternatively, this information may be included in an argument of one of the aforementioned plurality of subroutines, e.g., a subroutine that is executed foremost among the plurality of subroutines. Then, this information may be transferred from the host 110 to the device 120 together with that subroutine and stored in the inter-kernel information storage unit 220.

The inter-kernel data block dependence information indicates, for example, whether or not there is a write block that is used as a read block of a subsequently-executed subroutine among a plurality of write blocks in a previously-executed subroutine, and when there is one that is used, indicates a correspondence relation between the write block and the read block.

Note that in the case where: the subroutine has no relevance to other subroutines; the read block for which its operation is performed is not a write block that is an operation result of other subroutines; and the write block that is its operation result does not become a read block of other subroutines, the inter-kernel data block dependence information indicates "no dependence".

The arithmetic control unit 200 controls the arithmetic unit 140 based on the detail of the operation indicated by the program from the host 110, the attribute group stored in the attribute group storage unit 210, the inter-kernel data block dependence information stored in the inter-kernel information storage unit 220. To that end, the scenario determination unit 230 determines a transfer mode based on the attribute group stored in the attribute group storage unit 210 and controls an operation performed by the arithmetic unit 140 and a data transfer involved in the operation based on the determined transfer mode.

The arithmetic unit 140 performs the operation under the control of the arithmetic control unit 200 and thereby obtains an operation result. The operation performed by the arithmetic unit 140 involves a read transfer for transferring data to be operated from the device memory 150 to the private memory 164 or the local memory 170, and a write transfer for transferring the operation result data from the private memory 164 or the local memory 170 to the device memory 150.

Therefore, the arithmetic control unit 200 receives the program from the host 110 and receives attribute groups that are set for a read block read by the subroutine included in the program and a write block written by the subroutine, respectively.

The attributes of a data block that are set as attribute values include a read attribute, a write attribute, a margin attribute, a broadcast attribute, an assignment attribute, a hierarchy attribute, a dependence attribute, and a shape attribute (shape information), which is newly added in the data processing method according to the first embodiment. The shape attribute includes information about the shape of a sub-data block such as a rectangle and a parallelogram, and information about the coordinates of the sub-data block such as a one-dimensional array of XY-coordinates, and XY-coordinates of vertexes of a rectangle or a parallelogram.

For a data block exchanged between subroutines, when its attribute values on the reading side and the writing side and so on satisfy the division-possible condition, the arithmetic control unit 200 divides the data block according to the capacity of a memory on a high layer (the private memory 164 or the local memory 170) and controls the arithmetic unit 140 so that the memory on the high layer becomes the write destination or the read source of the sub-data blocks obtained by the division. The division-possible condition includes the above-described attribute values and performance/configuration information (the memory capacity, the time necessary for the access and so on) of the arithmetic element 162 and memories on a plurality of layers such as the global memory 152, the local memory 170 and the private memory 164.

Under normal conditions, data to be operated and operation result data are stored in the global memory 152. Therefore, the following explanations are given on the assumption that the "read transfer" and the "write transfer" are transfers between the global memory 152 and the private memory 164 or the local memory 170. When data to be operated is stored in the constant memory 154, the transfer from the constant memory 154 to the private memory 164 or the local memory 170 is also included in the "read transfer".

The memory access monitoring unit 300 monitors the read transfer and the write transfer of a data block whose shape attribute indicates a non-rectangle or its sub-data block in the global memory 152 and outputs memory access information at the time of the transfer to the arithmetic control unit 200.

Next, a processing procedure in an example case where the data processing method according to the first embodiment is implemented by using the OpenCL device 120 is explained in relation to image data blocks and the like before and after a subroutine.

Figure 3:
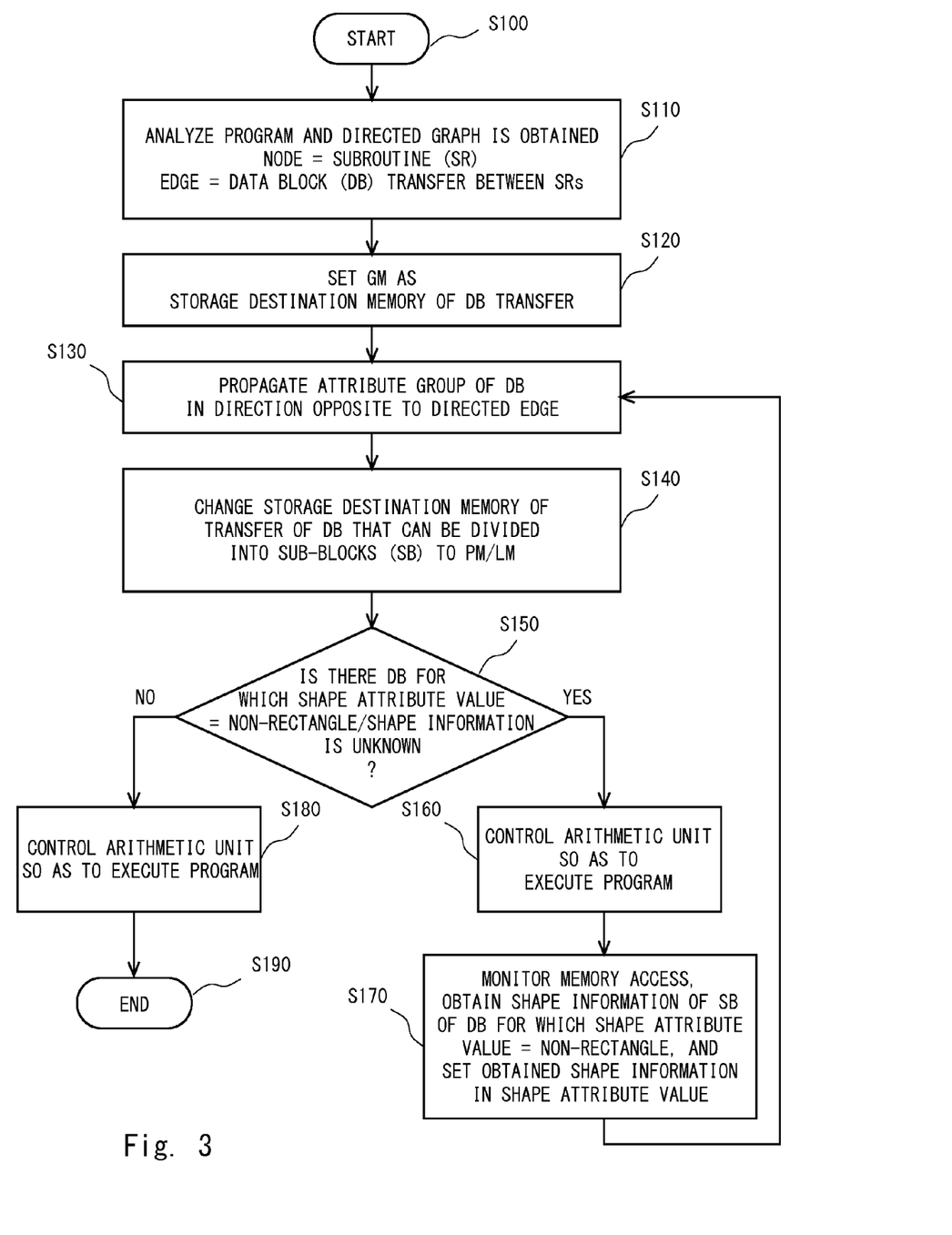
FIG. 3 is a flowchart showing a processing procedure of a data processing method according to the first embodiment.

FIG. 3 is a flowchart showing a processing procedure of the data processing method according to the first embodiment. The arithmetic control unit 200 has already received a program and an attribute group from the host 110. Note that due to the restriction on the size of the drawing, the term "sub-data block" is simply expressed as "sub-block" in FIG. 3 and the subsequent figures.

When the process starts (step S100), the arithmetic control unit 200 analyzes the program and obtained a directed graph in which subroutines (SRs) are defined as nodes and data block (DB) transfers among subroutines are defined as edges (step S110). Then, a global memory (GM) is defined as the storage destination of a data block exchanged between subroutines within the program (step S120).

Figure 4:
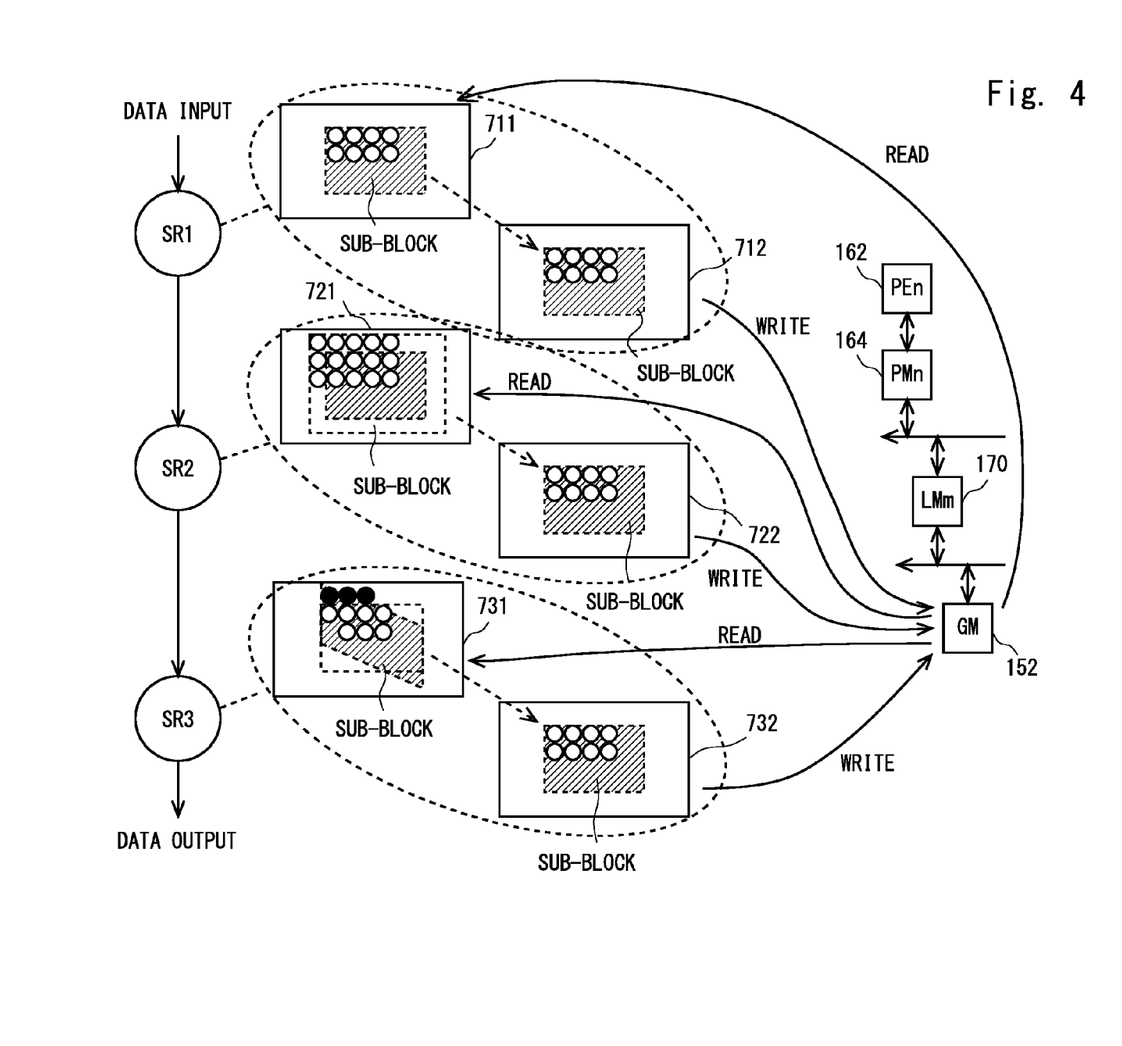
FIG. 4 shows an original correspondence relation among subroutines, data blocks, and memories on a plurality of layers according to the first embodiment.

FIG. 4 shows an original correspondence relation among subroutines, data blocks, and memories on a plurality of layers according to the first embodiment. In particular, FIG. 4 shows a directed graph after the global memory (GM) 152 is defined as the storage destination of image data blocks 711, 712, 721, 722, 731 and 732 exchanged among subroutines within the program in the step S120.

White circles in the data blocks 711 to 732 represent pixels (array elements) constituting the data blocks 711 to 732. Further, hatching in the data blocks 711, 712, 721, 722, 731 and 732 represents sub-data blocks. However, as described later, depending on attributes set for a data block, the data block may be divided into sub-data blocks so as to include a reference area or the like.

Dotted lines extending from respective subroutines SRs, ellipses drawn by dotted lines connected to the aforementioned dotted lines, and dotted lines with arrows in the ellipses drawn by the dotted lines indicate correspondence relations among the subroutines SRs, read blocks, and write blocks. For example, the read block 711 and the write block 712 inside the ellipse drawn by the dotted line connected to the dotted line extending from the subroutine SR1 indicate that the read block 711 is processed by the subroutine SR1 and becomes the write block 712.

This program is composed of three subroutines SR1, SR2 and SR3. The program is supplied with the data block 711 from the host 110 and the data block 711 is stored in the global memory 152 before the process starts (step S100).

The subroutine SR1 reads (i.e., causes a computer or the like to read) the read block 711 from the global memory 152, processes it, and writes the write block 712 into the global memory 152. Similarly, the subroutines SR2 and SR3 read the read blocks 721 and 731, respectively, from the global memory 152, process them, and write the write blocks 722 and 732, respectively, into the global memory 152.

Each of the data blocks 711 to 732 is provided with a shape attribute in addition to a size attribute, a read attribute, a write attribute, a margin attribute, a broadcast attribute, an assignment attribute, a hierarchy attribute, and a dependence attribute as an attribute group.

Further, each of the data blocks 711 to 732 is a two-dimensional array data and has two dimensions, i.e., an X-direction and a Y-direction. Further, all of the data blocks 711 to 732 are provided with the same size attribute value.

To obtain one array element of the write block 712, the subroutine SR1 refers to an array element of the read block 711 having the same coordinates as those of the array element of the write block 712. Therefore, the margin attribute value of the read block 711 is zero in both the X-direction and the Y-direction. The margin attribute for the write block 712 is ineffective and thus is not set. Further, the shape attribute values of the read block 711 and the write block 712 are rectangles.

To obtain one array element of the write block 722, the subroutine SR2 refers to an array element of the read block 721 having the same coordinates as those of the array element of the write block 722 and eight array elements located around that array element, i.e., elements located above, below, to the left of, to the right of, at the upper left of, at the upper right of, at the lower left of, and at the lower right of that array element of the read block 721. In FIG. 4, the area that the subroutine SR2 refers to is indicated by dotted lines around the hatching. Therefore, the margin attribute value of the read block 721 is one in both directions. That is, when the read block 721 is divided into sub-read blocks, it has to be divided so that the reference area is included in the sub-read blocks. Further, the shape attribute values of the read block 721 and the write block 722 are rectangles.

The subroutine SR3 is a process similar to a distortion correction in image processing. To obtain an array element of the rectangular write block 732, the subroutine SR3 refers to an array element of the read block 731 having a distorted shape having coordinates displaced from those of the array element of the write block 732 by a predetermined displacement vector that is determined according to the coordinates of the array element of the write block 732. Note that the shape attribute value of the read block 731 is a non-rectangle and its specific shape is unknown. Therefore, the shape information of the read block 731 is not set yet.

Therefore, it is necessary to temporarily write the write block 722 of the subroutine SR2 into the global memory 152 and read the read block 731 of the subroutine SR3 from the global memory 152 again. Note that the shape attribute value of the write block 732 is a rectangle. The margin attribute value of the read block 731 is zero in both directions.

Next, the arithmetic control unit 200 propagates the attribute values of the write block and the read block exchanged among the subroutines SRs in the direction opposite to the directed edge in the directed graph (step S130), determines whether each data block can be divided or not based on the attribute values obtained by the propagation and the configuration information of the arithmetic unit 140, and when the division is possible, allocates the private memory (PMn) 164 or the local memory (LMn) 170 as the storage destination of the sub-data blocks (step S140). When the division is impossible, the arithmetic control unit 200 maintains the global memory 152 as the storage destination of the data block.

The processes related to the steps S130 and S140 are explained hereinafter in a more detailed manner.

Firstly, the following idea is examined: the read block 711 of the subroutine SR1 is divided into sub-read blocks having such a size that they can be stored into the private memory 164; the processing of the subroutine SR1 for each of the sub-read blocks is performed in parallel by a plurality of arithmetic elements (PEs) 162; and the write block 712, which is a processing result, is delivered to the subroutine SR2 through the private memory 164. When the above-described processes are carried out, there is no common array element among the sub-write blocks of the write block 712 stored in the plurality of private memories 164.

Next, the division of the read block 721 is examined. The margin attribute value of the read block 721 is "(X,Y)=(1, 1)". Therefore, to execute the subroutine SR2 for the sub-write blocks of the write block 712, array elements around the sub-write blocks are necessary. For example, the arithmetic element 162 needs to access not only array elements of sub-data blocks stored in the private memory 164 belonging to that arithmetic element 162 itself but also array elements of sub-data blocks stored in the private memory 164 belonging to other arithmetic elements 162. However, such access is impossible. Even if the local memory 170 is defined as the write destination of the sub-write blocks of the write block 712, a problem similar to the above-described problem occurs.

As described above, since the margin attribute value of the read block 721 is "(X,Y)=(1,1)", the private memory 164 cannot be defined as the write destination of the write block 712. Therefore, the global memory 152 is defined as the write destination of the write block 712 at this point. However, there are cases where although the attribute value of a data block does not originally satisfy the division condition, the attribute value satisfies the division condition after the attribute value is propagated in the direction opposite to the data flow or the process flow within the program. In such cases, the data block is divided into sub-data blocks and the storage destination of the sub-data blocks is changed to the private memory 164 or the local memory 170.

Figure 5:
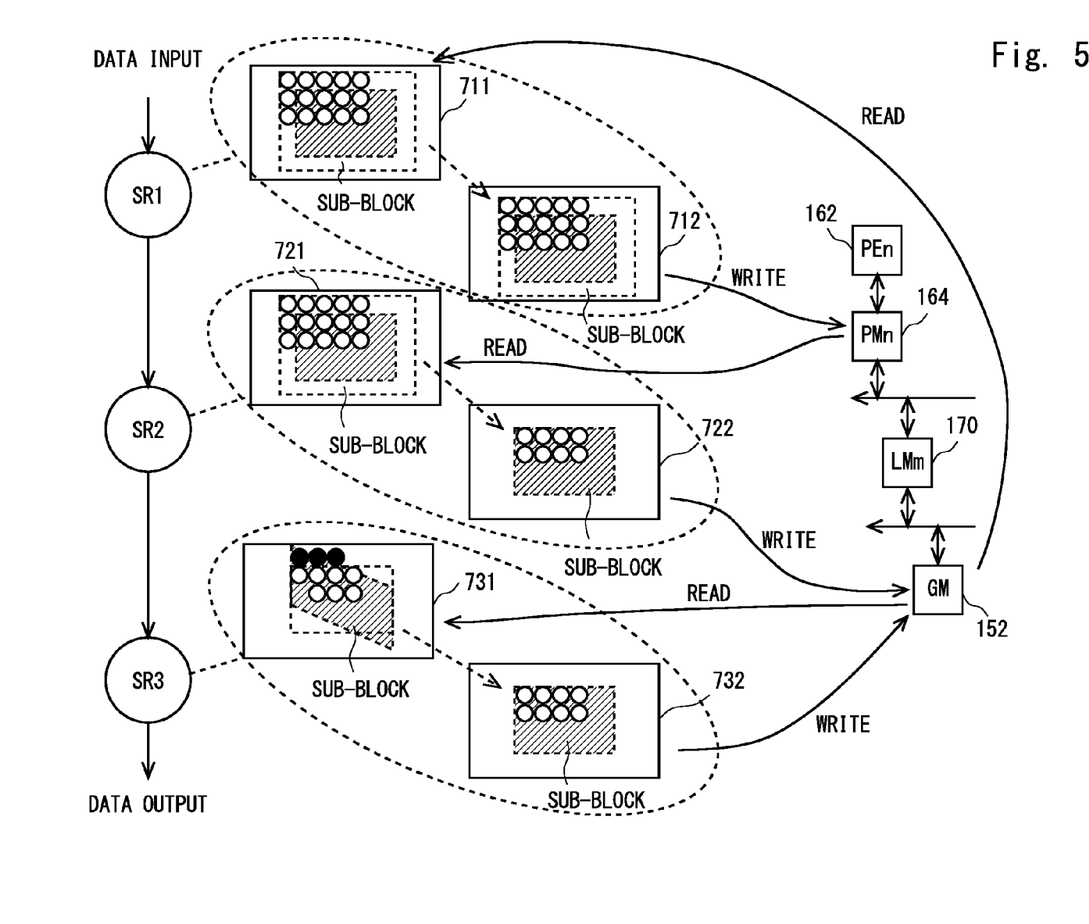
FIG. 5 shows a changed correspondence relation among subroutines, data blocks, and memories on a plurality of layers according to the first embodiment.

FIG. 5 shows a changed correspondence relation among subroutines, data blocks, and memories on a plurality of layers according to the first embodiment. In particular, FIG. 5 shows a directed graph after the write destination of the write block 712 and the read source of the read block 721 are changed to the private memory 164.

In the data processing method according to the first embodiment, while data and processes advance in the direction from the subroutine SR1 to the subroutine SR3, the attribute value is propagated in the direction opposite to the direction of the data and processes. The arithmetic control unit 200 propagates the margin attribute value "(X,Y)=(1, 1)" of the read block 721, calculates the logical sum of the margin attribute value "(X,Y)=(1, 1)" of the read block 721 and the margin attribute value "(X, Y)=(0,0)" of the read block 711, and changes the margin attribute value of the read block 711 to "(X,Y)=(1,1)". This can solve the mismatch between the margin attribute of the read block 721 and that of the read block 711. In FIG. 5, the reference area by the margin attribute is indicated by dotted lines around the hatching.

Then, the write block 712 of the subroutine SR1 is divided into sub-write blocks of the same array elements as those of the sub-read blocks of the read block 721, thus making it possible to change the storage destination of the sub-write blocks to the private memory 164. Then, the time necessary for the writing of the write block 712 and the reading of the read block 721 can be reduced and hence the execution time of the program can be reduced.

Note that the propagation of the attribute value is not limited to that of the margin attribute value. That is, the propagation of all attribute values is possible. That is, in the propagation of the attribute value, the logical sum or the logical multiplication of each of the attribute values of a read block P of the previously-executed subroutine SR_X and a respective one of the attribute values of a read block S of the subsequently-executed subroutine SR_Y is calculated on an attribute-by-attribute basis, and the logical sum or the logical multiplication of each pair of attribute values is defined as a new attribute value of the read block P of the subroutine SR_X.

Specifically, the propagation of such attribute values is performed by the scenario determination unit 230 included in the arithmetic control unit 200. The scenario determination unit 230 changes a program specifying a data transfer mode such as how the arithmetic element 162 accesses a data block, and thereby propagates an attribute value.

Note that when the scenario determination unit 230 compares, for each attribute, the attribute value of the read block P of the subroutine SR_X and that of the read block S of the subroutine SR_Y or calculates a difference thereof and determines that the attribute value of the read block P is short of something, for example, determines that the read block P is short of pixel value data of a pixel(s) corresponding to a margin part of the margin attribute, the scenario determination unit 230 determines that it should propagate the attribute value.

Further, the scenario determination unit 230 may determine to propagate an attribute value based on inter-kernel data block dependence information stored in the inter-kernel information storage unit 220.

Further, the scenario determination unit 230 may determine to propagate an attribute value when the assignment attribute of the write block of the subroutine SR_X is identical to that of the read block of the subroutine SR_Y.

Incidentally, in the data processing method according to the first embodiment, the shape attribute that enables the division and the change of the storage destination of a data block whose sub-data blocks are non-rectangles is added in the attribute group. Further, the memory access monitoring unit 300 for obtaining specific sub-data block shape information is added in the device 120. As a result, it is possible to achieve an advantageous effect that the shape attribute value is propagated as in the case of the above-described margin attribute value and the execution time of the program is thereby further reduced.

The arithmetic control unit 200 determines whether or not there is a data block whose shape attribute value is a non-rectangle and whose shape information, for example, coordinate information is unknown (step S150). The shape attribute value of the read block 731 is a non-rectangle and its shape information has not been obtained yet (Yes at step S150). Therefore, the arithmetic control unit 200 controls the arithmetic unit 140 and thereby executes the program while maintaining the global memory 152 as the storage destination of the write blocks 722 and 732 (step S160).

When doing so, the memory access monitoring unit 300 does not monitor memory access for reading and writing the data blocks 711, 712, 721, 722 and 732 whose shape attribute values are rectangles, and does monitor memory access to the global memory 152 for the read block 731 whose shape attribute value is a non-rectangle. Further, the memory access monitoring unit 300 acquires information about a pair of the arithmetic element 162 that accesses the memory and the memory address to be accessed as memory access information and outputs the acquired memory access information to the arithmetic control unit 200.

The arithmetic control unit 200 calculates the shape information, which has been unknown until this point, of the read block 731 from this memory access information and adds the calculated shape information in the shape attribute value (step S170). Then, the arithmetic control unit 200 propagates the shape attribute value of the read block 731 in the direction from the subroutine SR3 to the subroutine SR1 (step S130) and changes the shape attribute values of the data blocks 711, 712, 721 and 722.

The arithmetic control unit 200 changes the shape attribute values of the data blocks 711, 712, 721 and 722 so that their shape attribute values become identical to the shape attribute value of the read block 731. This solves the mismatch among the shape attribute values of the data blocks. Further, the margin attribute values of the data blocks 711, 712 and 721 are set for the shape attribute value of the write block 722. Then, the arithmetic control unit 200 divides the data blocks 711, 712, 721, 722 and 731, which have become dividable into sub-data blocks, into sub-data blocks and changes the storage destination of the sub-data blocks of the data blocks 712, 721, 722 and 731 to the private memory 164 (step S140).

Figure 6:
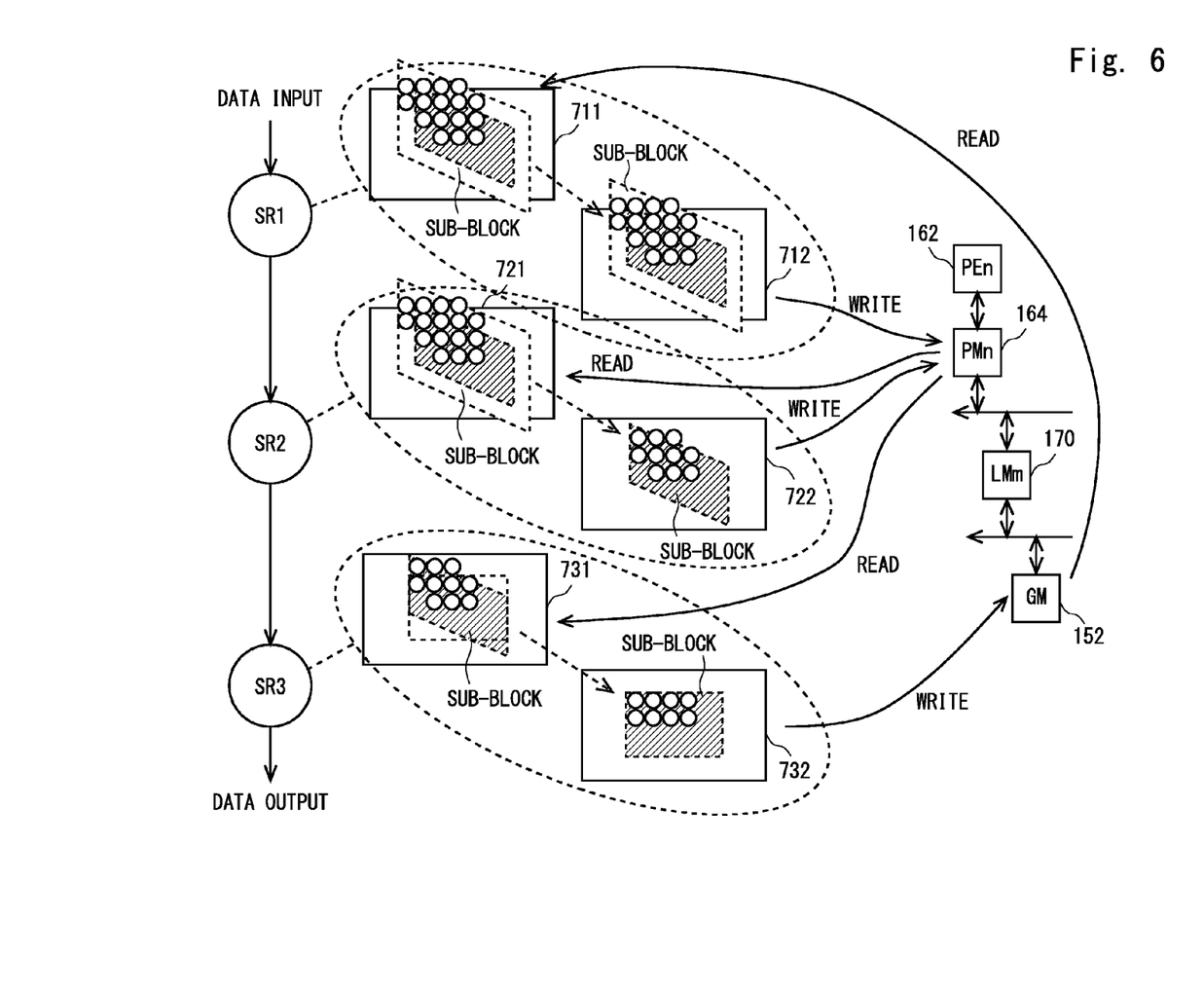
FIG. 6 shows a further changed correspondence relation among subroutines, data blocks, and memories on a plurality of layers according to the first embodiment.

FIG. 6 shows a further changed correspondence relation among subroutines, data blocks, and memories on a plurality of layers according to the first embodiment. In particular, FIG. 6 shows a directed graph after the write destination of the write blocks 712 and 722 and the read source of the read blocks 721 and 731 are changed to the private memory 164. The reference area by the margin attribute is indicated by dotted lines around the hatching.

Through the above-described processes, there is no sub-data block whose shape attribute value is a non-rectangle and whose specific shape information is unknown any longer (No at step S150). Therefore, the arithmetic control unit 200 controls the arithmetic unit 140 based on the attribute values set in the above-described processes and thereby executes the program (step S180).

Then, the processes in the data processing method according to the first embodiment have been finished (step S190).

Note that the program may be amended so that the storage memory addresses of the non-rectangular sub-data blocks become a series of areas by converting the coordinates of the array elements in the sub-data blocks in order to store the non-rectangular sub-data blocks into the private memory 164 having a small capacity.

Further, in the data processing method according to the first embodiment, a step of determining, for each data block exchanged between the subroutines, whether or not the attribute value and the performance/configuration information of the arithmetic element and memories on a plurality of layers satisfy a predetermined condition may be added after the step where the shape information is added in the shape attribute value (step S170) and before the step where the shape attribute value is propagated in the direction from the subroutine SR3 to the subroutine SR1 (step S130). Then, when it is determined that the predetermined condition is not satisfied, the shape attribute value may be propagated from the subroutine SR3 to the subroutine SR1 (step S130). In this case, if it is determined that the predetermined condition is satisfied, the data blocks, which have become dividable into sub-data blocks, are divided into sub-data blocks and the storage destination of the sub-data blocks are changed to the private memory 164 (step S140).

As explained above, the data processing method according to the first embodiment is a data processing method for a data processing device 120 including: a program execution unit 140 including a processor 162 and memories 152, 154, 170 and 164 on a plurality of layers; an arithmetic control unit 200 that receives a program and attribute values, the program including a plurality of subroutines SR1, SR2 and SR3 for causing the processor 162 to read a read block 711, 721 or 731 from the memory 152, 154, 170 or 164, perform data processing, and write a write block 712, 722 or 732 to the memory 152, 154, 170 or 164, the write block 712, 722 or 732 being a result of the data processing, the attribute values being set for the read block 711, 721 or 731 and the write block 712, 722 or 732, respectively; and a memory access monitoring unit 300, the data processing method including: a step S160, by the program execution unit 140, of executing the program; a step S170, by the memory access monitoring unit 300, of monitoring a memory transfer of the data block 731 or a sub-data block whose shape attribute value is a non-rectangle performed between the sub-routines SR2 and SR3 and outputting memory access information related to the memory transfer to the arithmetic control unit 200; and a step S180, by the arithmetic control unit 200, of: calculating a shape attribute value by converting a read address or a write address of the data block 731 based on the memory access information (step S170); correcting an attribute value by propagating the attribute value including at least the calculated shape attribute value in a direction opposite to a data flow or a process flow within the program (step S130); dividing, for each of the data blocks 711, 712, 721, 722, 731 and 732 exchanged among the subroutines SR1, SR2 and SR3, the data block 711, 712, 721, 722, 731 or 732 into sub-data blocks when the attribute value and performance/configuration information of the processor 162 and the memory 152, 154, 170 or 164 satisfy a predetermined condition (step S140); selecting the memory 170 or 164 from which the sub-data blocks are read or to which the sub-data blocks are written from among the memories 152, 154, 170 and 164 on the plurality of layers (step S140); and controlling memory access to the data block 711, 712, 721, 722, 731 or 732 or the sub-data blocks and execution of a subroutine related to the data block 711, 712, 721, 722, 731 or 732 performed by the processor 162.

Further, in the data processing method according to the first embodiment, the arithmetic control unit 200 preferably propagates the attribute value including at least the calculated shape attribute value in the direction opposite to the data flow or the process flow within the program and thereby corrects the attribute value only when, for each of the data blocks 711, 712, 721, 722, 731 and 732 exchanged among the subroutines SR1, SR2 and SR3, the attribute value and performance/configuration information of the processor 162 and the memories 152, 154, 170 or 164 on the plurality of layers do not satisfy the predetermined condition.

Further, in the data processing method according to the first embodiment, the program preferably includes the first subroutine SR2 and the second subroutine SR3 that is executed after the first subroutine SR2. A first attribute value is preferably set in the data block 721 of the first subroutine SR2 and a second attribute value that is related to the same attribute as that of the first attribute value is preferably set in the data block 731 of the second subroutine SR3. When an attribute value is corrected, the logical sum or the logical multiplication of the first and second attribute values is preferably calculated and the calculated logical sum or the logical multiplication is preferably defined as a new first attribute value.

Further, a program according to the first embodiment is for causing the data processing device 120 to execute each step of the data processing method according to the first embodiment. In the data processing method or the program according to the first embodiment, by the above-described configuration, when a memory transfer is performed among the subroutines SR1, SR2 and SR3, the data block 711, 712, 721, 722, 731 or 732 or the sub-data blocks can be exchanged in the memory 170 or 164, which is a memory on as high a layer as possible among the memories 152, 154, 170 and 164 on the plurality of layers. As a result, the execution time of the program can be reduced and hence the processing efficiency can be improved.

Second Embodiment

In a data processing method according to a second embodiment, a shape dependent attribute is further added in the attribute group that the host provides to each data block. The memory access monitoring unit monitors a change of a shape-determination data block designated by the shape dependence attribute and the arithmetic control unit recalculates the shape attribute value when the shape-determination data block is changed. By doing so, a data block for which the shape of a sub-data block is dependent on other data blocks is exchanged in a high-speed memory and hence the execution time of the program is further reduced.

The configuration of a data processing device according to the second embodiment is similar to that of the data processing device 120 according to the first embodiment shown in FIG. 2, and therefore its illustration in the drawings is omitted. The shape dependence attribute added in the attribute group indicates, when the shape attribute value of a read block is a non-rectangle, its specific shape information such as whether or not the coordinate information is dependent on other read blocks and, when it is dependent on the other read blocks, which read block it is dependent on. Further, a pointer to the other read block on which the read block is dependent is provided as the shape dependence attribute of the read block whose shape attribute value is a non-rectangle.

Figure 7:
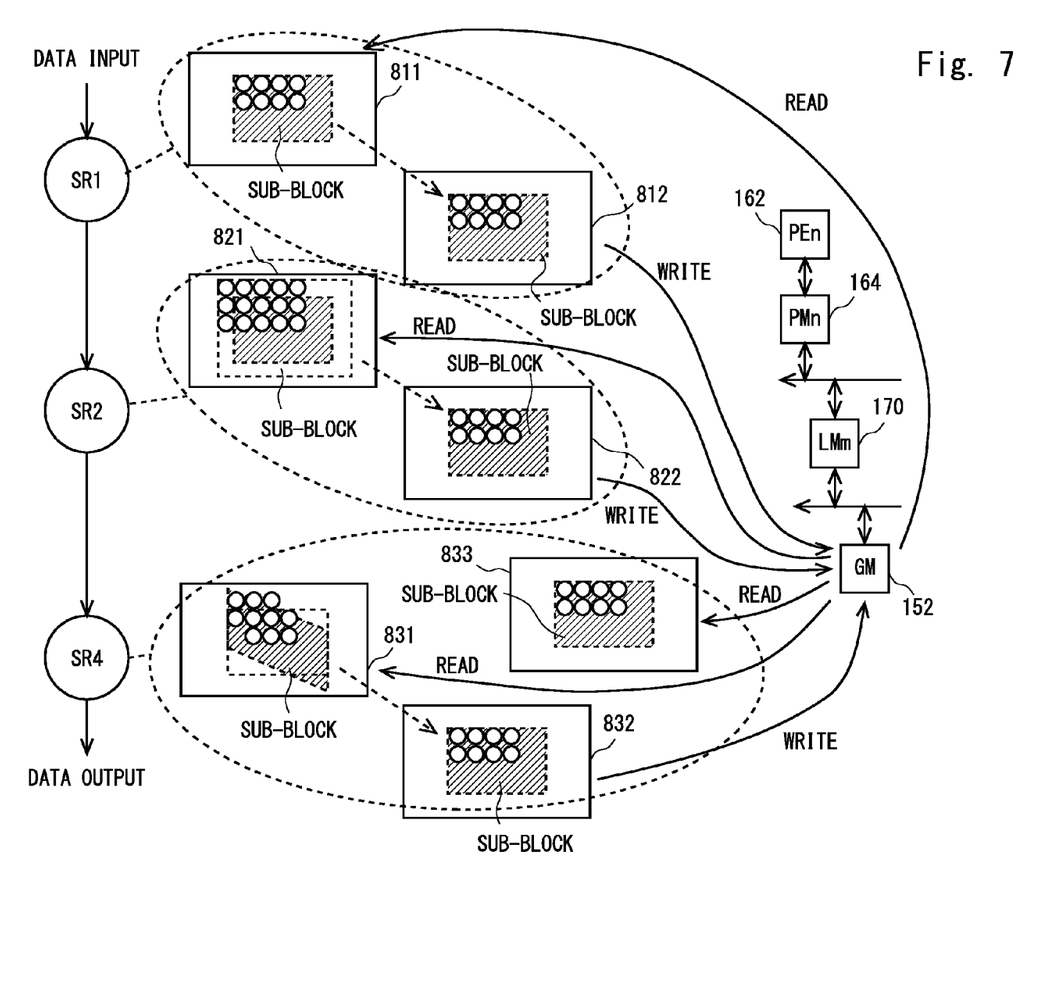
FIG. 7 shows an original correspondence relation among subroutines, data blocks, and memories on a plurality of layers according to a second embodiment.

FIG. 7 shows an original correspondence relation among subroutines, data blocks, and memories on a plurality of layers according to the second embodiment. When compared with the original correspondence relation according to the first embodiment shown in FIG. 4, the subroutine SR3 is changed to a subroutine SR4. The subroutine SR4 is an operation where data blocks 831 and 833 are defined as read blocks and a data block 832 is defined as a write block. Further, the read blocks 831 and 833 are read from the global memory 152. The read block 833 corresponds to the displacement vector information expressed inside the shape attribute of the read block 731 according to the first embodiment. That is, the distortion of the read block 831 is depended on the read block 833. Further, the read block 833 could be different from the previous one every time the program is executed.

In the data processing method according to the second embodiment, the shape of sub-read blocks is depended on the displacement vector information when the read block 831 is divided into the sub-read blocks. Therefore, when the read block 833, which provides the displacement vector information, is changed, the specific shape information of the sub-read blocks included in the shape attribute value of the read block 831 is changed. Therefore, a pointer to the read block 833 is provided to the read block 831 as a shape dependence attribute value.

Figure 8:
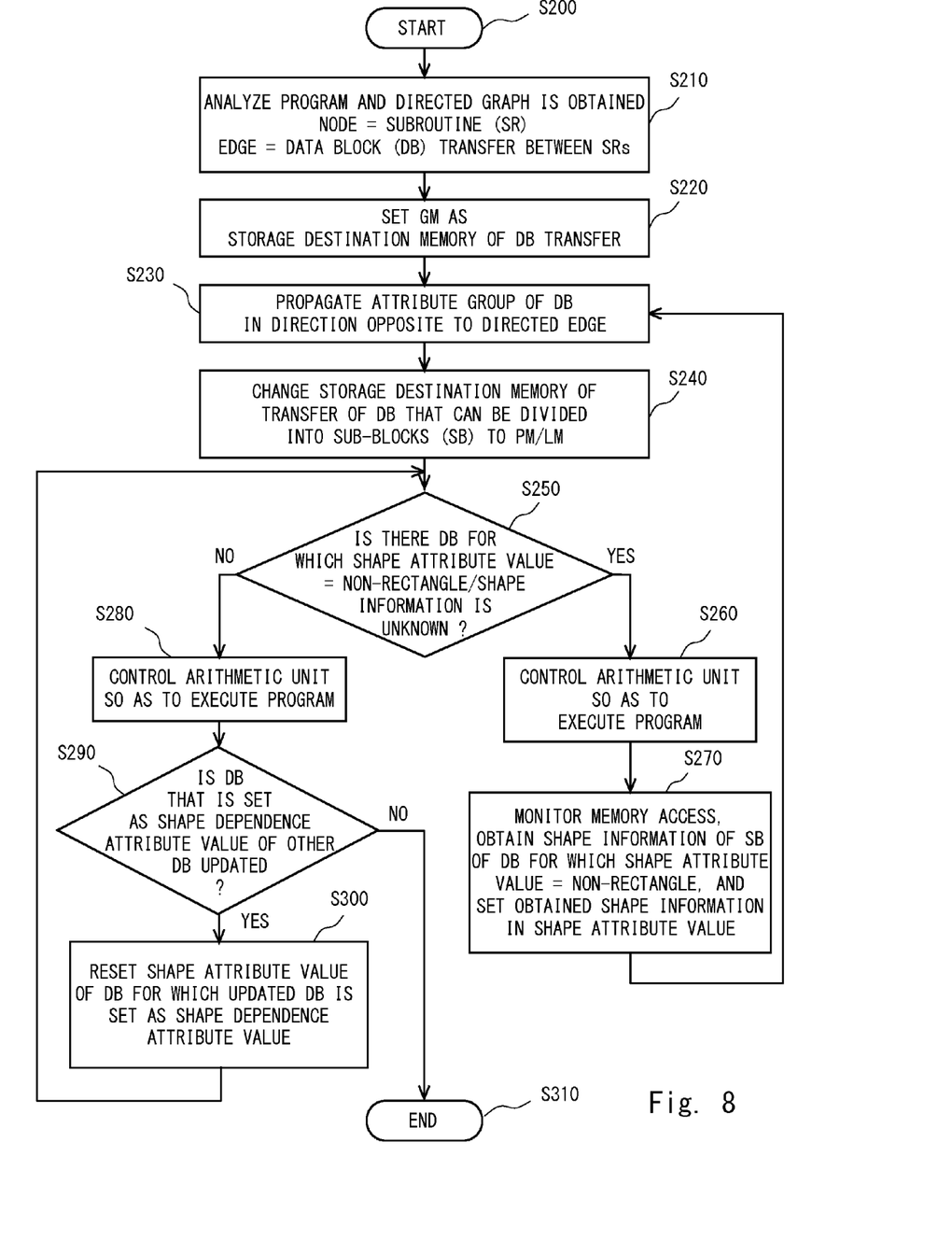
FIG. 8 is a flowchart showing a processing procedure of a data processing method according to the second embodiment.

FIG. 8 is a flowchart showing a processing procedure of the data processing method according to the second embodiment. Processes in steps S200 to S280 are similar to those in the steps S100 to S180 of the data processing method according to the first embodiment shown in FIG. 3, and therefore their detailed explanations are omitted.

The memory access monitoring unit 300 monitors access to the read block 833, which is the shape-determination data block indicated by the pointer as the shape dependence attribute value, and outputs information on whether the read block 833 has been updated or not to the arithmetic control unit 200 (step S290).

When the read block 833 has been updated (Yes at step S290), the arithmetic control unit 200 resets (i.e., initializes) the shape attribute values of the data blocks 811, 812, 821, 822 and 831 and thereby restores them to those indicating that the shapes of the data blocks are non-rectangles and include no specific shape information (step S300). These shape attribute values are the same as those of the data blocks 711, 712, 721 and 722 according to the first embodiment shown in FIG. 5.

Next, the arithmetic control unit 200 performs processes in steps S250 to S270 and a step S230 and thereby obtains specific shape information of the sub-data blocks of the data blocks 811, 812, 821, 822 and 831. Further, the arithmetic control unit 200 updates the shape attribute values of these data blocks.

Then, the arithmetic control unit 200 recalculates the memory at the storage destination of data blocks exchanged between the subroutines within the program and assigns each of the data blocks to a memory(ies) in as high a layer(s) as possible (step S240).

Note that when the read block 833 has not been updated (No at step S290), the arithmetic control unit 200 finishes the processes of the data processing method according to the second embodiment (step S310).

Figure 9:
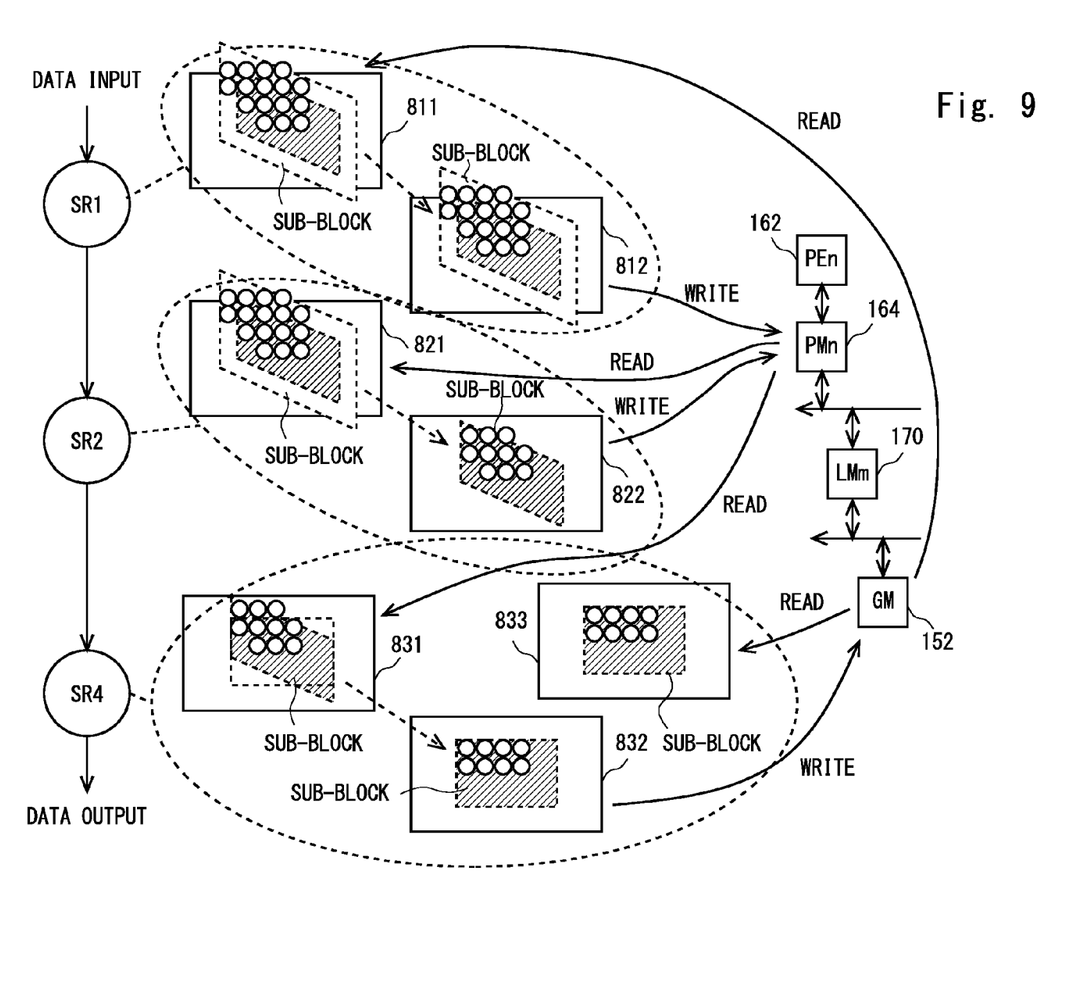
FIG. 9 shows a changed correspondence relation among subroutines, data blocks, and memories on a plurality of layers according to the second embodiment.

FIG. 9 shows a changed correspondence relation among subroutines, data blocks, and memories on a plurality of layers according to the second embodiment. In particular, FIG. 9 shows a directed graph after the write destination of the write blocks 812 and 822 and the read source of the read blocks 821 and 831 are changed to the private memory 164.

As explained above, in the data processing method according to the second embodiment, the attribute value preferably further includes the shape dependence attribute value. The shape dependence attribute value, when set for the first data block 831, preferably indicates the second data block 833 on which the shape of that first data block 831 is dependent. The data processing method according to the second embodiment preferably further includes a step where the memory access monitoring unit 300 monitors the update of the second data block 833 and outputs information about the update to the arithmetic control unit 200, and a step where the arithmetic control unit 200 resets (i.e., initializes) the shape attribute value of the data block 811, 812, 821, 822 or 831 including at least the first data block 831 based on the information about the update.

In the data processing method according to the second embodiment, by the above-described configuration, the data block 831 for which the shape of a sub-data block is dependent on the other data block 833 is exchanged in the memory 170 or 164 in a high layer and hence the execution time of the program can be further reduced.

The present invention made by the inventors has been explained above in a specific manner based on embodiments. However, the present invention is not limited to the above-described embodiments, and needless to say, various modifications can be made without departing from the spirit and scope of the present invention.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A data processing method for a data processing device, the data processing device comprising:
   a program execution unit comprising a processor, and memories on a plurality of layers;
   an arithmetic control unit that receives a program and attribute values, the program including a plurality of subroutines for causing the processor to read a read block from the memory, perform data processing, and write a write block to the memory, the write block being a result of the data processing, the attribute values being set for the read block and the write block, respectively; and
   a memory access monitoring unit,
   the data processing method comprising:
   a step of executing, by the program execution unit, the program;
   a step of monitoring, by the memory access monitoring unit, a memory transfer of a data block or a sub-data block whose shape attribute value is a non-rectangle performed between the sub-routines and outputting memory access information related to the memory transfer to the arithmetic control unit; and
   a step, performed by the arithmetic control unit, of:
   calculating a shape attribute value by converting a read address or a write address of the data block based on the memory access information;
   correcting an attribute value by propagating the attribute value including at least the calculated shape attribute value in a direction opposite to a data flow or a process flow within the program;
   dividing, for each data block exchanged between the subroutines, the data block into sub-data blocks when the attribute value and performance/configuration information of the processor and the memory satisfy a predetermined condition;
   selecting a memory from which the sub-data blocks are read or to which the sub-data blocks are written from among the memories on the plurality of layers; and
   controlling memory access to the data block or the sub-data blocks and execution of a subroutine related to the data block performed by the processor.

2. The data processing method according to claim 1, wherein the arithmetic control unit propagates the attribute value including at least the calculated shape attribute value in the direction opposite to the data flow or the process flow within the program and thereby corrects the attribute value only when, for each data block exchanged between the subroutines, the attribute value and performance/configuration information of the processor and the memory do not satisfy the predetermined condition.

3. The data processing method according to claim 1, wherein
   the program comprises a first subroutine and a second subroutine, the second subroutine being executed after the first subroutine,
   a first attribute value is set in the data block of the first subroutine, a second attribute value is set in the data block of the second subroutine, the second attribute value being related to the same attribute as that of the first attribute value, and when an attribute value is corrected, a logical sum or a logical multiplication of the first and second attribute values is calculated and the calculated logical sum or the logical multiplication is defined as a new first attribute value.

4. The data processing method according to claim 1, wherein the attribute value further includes a shape dependence attribute value, the shape dependence attribute value, when set for the first data block, indicates the second data block on which a shape of that first data block is dependent, and the data processing method further comprises:

a step of monitoring, by the memory access monitoring unit, an update of the second data block and outputting information about the update to the arithmetic control unit; and a step of resetting, by the arithmetic control unit, the shape attribute value of the data block including at least the first data block based on the information about the update.

5. A non-transitory computer readable medium storing a program for causing the data processing device to execute each step of a data processing method for a data processing device, the data processing device comprising:

a program execution unit comprising a processor, and memories on a plurality of layers;

an arithmetic control unit that receives a program and attribute values, the program including a plurality of subroutines for causing the processor to read a read block from the memory, perform data processing, and write a write block to the memory, the write block being a result of the data processing, the attribute values being set for the read block and the write block, respectively; and a memory access monitoring unit, the data processing method comprising:

a step of executing, by the program execution unit, the program;

a step of monitoring, by the memory access monitoring unit, a memory transfer of a data block or a sub-data block whose shape attribute value is a non-rectangle performed between the sub-routines and outputting memory access information related to the memory transfer to the arithmetic control unit; and a step, performed by the arithmetic control unit, of:

calculating a shape attribute value by converting a read address or a write address of the data block based on the memory access information;

correcting an attribute value by propagating the attribute value including at least the calculated shape attribute value in a direction opposite to a data flow or a process flow within the program;

dividing, for each data block exchanged between the subroutines, the data block into sub-data blocks when the attribute value and performance/configuration information of the processor and the memory satisfy a predetermined condition;

selecting a memory from which the sub-data blocks are read or to which the sub-data blocks are written from among the memories on the plurality of layers; and controlling memory access to the data block or the sub-data blocks and execution of a subroutine related to the data block performed by the processor.

6. A data processing device comprising:

a program execution unit comprising a processor, and memories on a plurality of layers;

an arithmetic control unit that receives a program and attribute values, the program including a plurality of subroutines for causing the processor to read a read block from the memory, perform data processing, and write a write block to the memory, the write block being a result of the data processing, the attribute values being set for the read block and the write block, respectively; and a memory access monitoring unit, wherein the program execution unit executes the program, the memory access monitoring unit monitors a memory transfer of a data block or a sub-data block whose shape attribute value is a non-rectangle performed between the sub-routines and outputs memory access information related to the memory transfer to the arithmetic control unit, and the arithmetic control unit:

calculates a shape attribute value by converting a read address or a write address of the data block based on the memory access information;

corrects an attribute value by propagating the attribute value including at least the calculated shape attribute value in a direction opposite to a data flow or a process flow within the program;

divides, for each data block exchanged between the subroutines, the data block into sub-data blocks when the attribute value and performance/configuration information of the processor and the memory satisfy a predetermined condition;

selects a memory from which the sub-data blocks are read or to which the sub-data blocks are written from among the memories on the plurality of layers; and controls memory access to the data block or the sub-data blocks and execution of a subroutine related to the data block performed by the processor.

* * * * *